United States Patent [19]
Roberts

[11] Patent Number: 5,660,583
[45] Date of Patent: Aug. 26, 1997

[54] METHOD AND APPARATUS FOR REMOVING MEAT FROM BONES

[76] Inventor: Colin Andrew Roberts, Robertson Road, RD 9, Hamilton 2001, New Zealand

[21] Appl. No.: 374,796

[22] PCT Filed: Jul. 30, 1993

[86] PCT No.: PCT/NZ93/00060

§ 371 Date: Apr. 10, 1995

§ 102(e) Date: Apr. 10, 1995

[87] PCT Pub. No.: WO94/03070

PCT Pub. Date: Feb. 17, 1994

[30] Foreign Application Priority Data

Jul. 30, 1992 [NZ] New Zealand .................. 243789

[51] Int. Cl.[6] .................................... A22C 17/04
[52] U.S. Cl. .................................... 452/136; 452/138
[58] Field of Search .................... 152/136, 138, 152/135

[56] References Cited

U.S. PATENT DOCUMENTS

| | | | |
|---|---|---|---|
| 4,216,565 | 8/1980 | Volk et al. | 452/136 |
| 4,377,884 | 3/1983 | Viscolosi | 452/138 |
| 4,380,849 | 4/1983 | Adkinson et al. | 452/136 |
| 4,488,332 | 12/1984 | Atteck et al. | 452/136 |
| 4,811,456 | 3/1989 | Heuvel | 452/136 |
| 5,064,403 | 11/1991 | Elstien | 452/138 |
| 5,277,649 | 1/1994 | Adkison | 452/136 |

*Primary Examiner*—Willis Little
*Attorney, Agent, or Firm*—Knobbe, Martens, Olson & Bear, LLP

[57] ABSTRACT

The present invention describes a method and apparatus for removal of meat from bones. Bones particularly suitable are round elongate bones, such as commonly found in the limbs of animals. The apparatus uses a collar where, as the collar travels along the length of the bone, meat is pushed aheat of the collar resulting in its separation from the bone. Various clamping and retaining means may be used in conjunction with the apparatus. It may also be desirable to sever any tendons connecting meat to the bone before effecting travel of the collar.

25 Claims, 4 Drawing Sheets

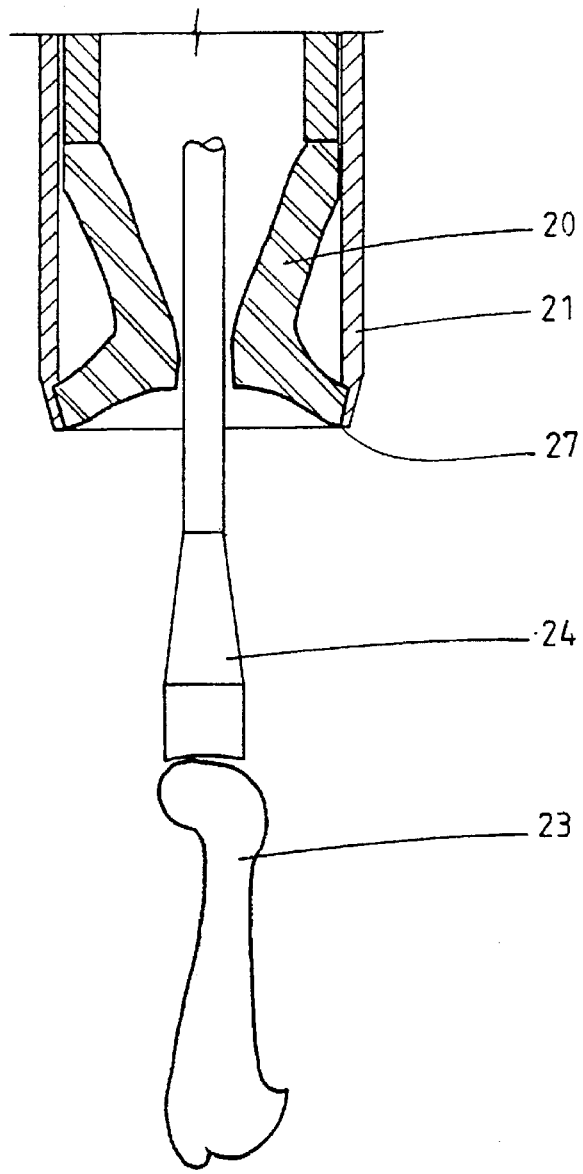
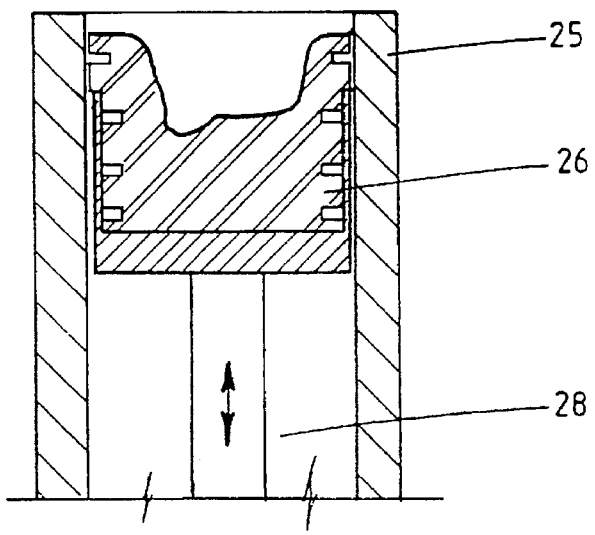
FIG.1.

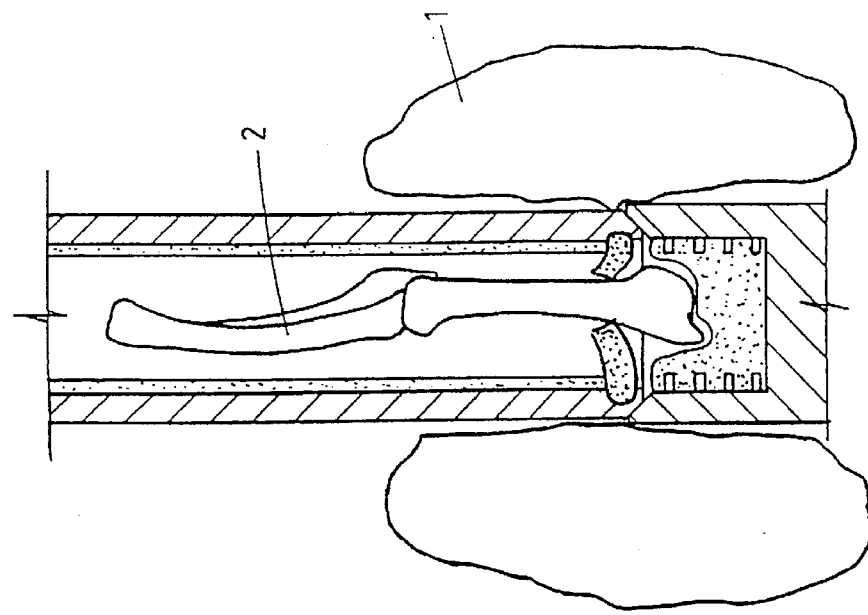
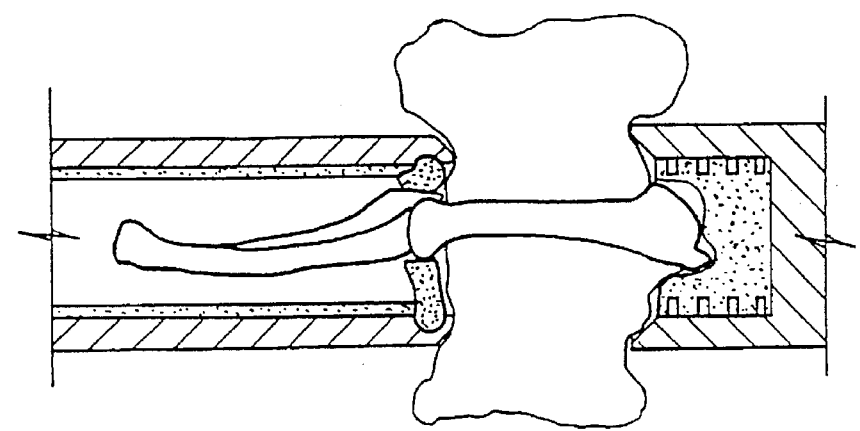
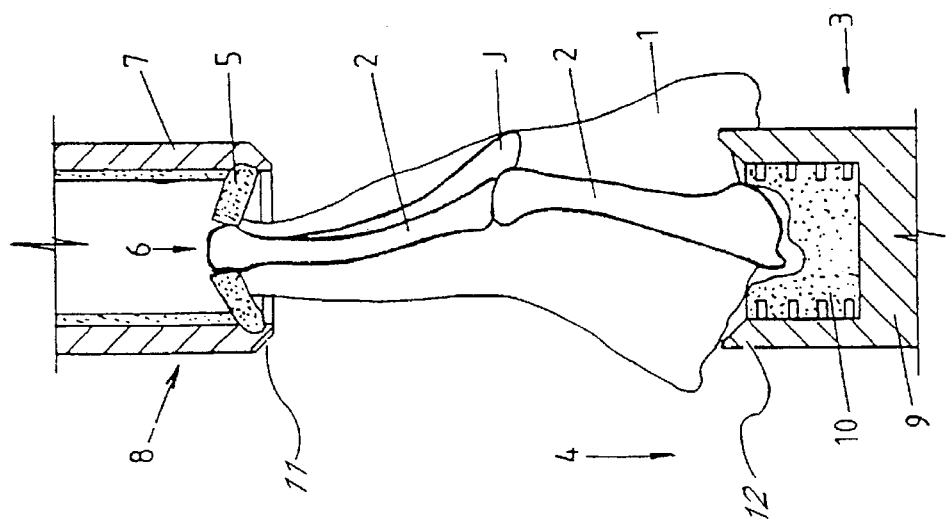

METHOD AND APPARATUS FOR REMOVING MEAT FROM BONES

TECHNICAL FIELD

The present invention relates to the separation of meat from bone material. Most embodiments are more suited to the removal of meat from elongate bones and/or bones of a relatively constant cross-sectional configuration and/or diameter. Preferred embodiments are especially suitable for the removal of meat from the humerus and radius bones of cattle or livestock though embodiments of the present invention will also find use with other bones and animals.

BACKGROUND ART

Traditional methods of removing meats from bones have centred around the use of a skilled worker to cut meat away from a bone. However, a reasonably high level of skill is required to become proficient with the techniques so as to remove a substantial proportion, if not all, meat from the bone and to avoid damage to the meat cut and bone (bone chips). In addition, the worker must be able to work at a relatively fast rate to keep pace with the semi-automated facilities and chains at many meat works.

Scraping methods have apparently been investigated, using a blade to attempt to remove meat from bone material though these are not entirely successful, especially for the round bones of an animal i.e. those bones which are substantially round in cross-section.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method for the removal of meat from bone comprising the relative movement of a flexible collar over bone material, the collar having an inner aperture occupied by said bone during meat removal and wherein said collar performs a scraping action on said bone material during meat removal.

According to another aspect of the present invention there is provided a method substantially as described above wherein there is deformation of said collar to accommodate bone material within its aperture, said deformation occurring along a substantial proportion of the length of bone material passing therethrough during meat removal.

According to another aspect of the present invention there is provided a method substantially as described above comprising steps of:

i) positioning the lower end of said bone or assemblage in first retaining means;

ii) securing the alternate end of said bone or assemblage in initial restraining means positioned near said end;

iii) severing tendons securing meat to bone near said alternate end;

iv) positioning a collar with a deformable inner aperture about said alternate end;

v) performing relative movement of the collar with respect to said bone or assemblage towards said lower end so as to peel meat from bone material;

vi) moving and/or withdrawing said initial restraining means to allow for the passage of moving components;

vii) severing any tendons securing meat to the lower end of said bone or assemblage.

According to a further aspect of the present invention there is provided apparatus for the removal of meat from bones comprising:

means for restricting movement of a bone or bone assemblage in at least one longitudinal direction;

a collar having an internal aperture and being deformable in this region to accommodate variations in the cross-sectional dimensions and configuration of bone material when positioned therein, and means for effecting relative motion of said collar and bone, or bone assemblage, in a substantially longitudinal direction.

According to another aspect of the present invention there is provided apparatus substantially as described above wherein said initial restraining means comprises a clamping mechanism acting directly or indirectly on said bone or bone assemblage.

According to another aspect of the present invention there is provided apparatus substantially as described above wherein said initial restraining means comprises an assembly with at least one fixed pin and a rotatable arrangement comprising a plurality of extending pins, the assembly characterised in that the pins of the rotatable arrangement can pierce or be positioned about the meat either side of said bone, and wherein the rotatable arrangement can be subsequently rotated so that a clamping action of the bone results from said fixed pin(s) and pins of the rotatable arrangement bearing substantially against said bone.

The present invention provides a method for the removal of meat from bone material.

Most embodiments of the methods according to the present invention, and apparatus for implementing those methods, will feature the relative movement of a flexible collar over bone material. Typically this collar will have an inner aperture which will be occupied by the bone during meat removal. A collar will typically provide a scraping type action on the bone during a meat removal operation though it is noted that while the collar may physically contact the bone material during such meat removal, it may not always contact the bone at all points or over the entire length of bone material passed therethrough.

In many instances, the meat or flesh surrounding the bone is held predominantly by the tendons. Consequently, in many instances once the tendon holding meat to the bone have been severed, any remaining meat will relatively freely peel back. However it should be appreciated that the type of bone in question, as well as the animal that it is from, will significantly influence the ease by which meat can be removed.

Most embodiments of the present invention have been adapted for use with round bones, that is those bones which have relatively circular cross-section. In many cases, the round bones will have a relatively constant cross-sectional dimensions though again this depends upon the particular bone and animal from which it is derived. Two examples of round bones, are the humerus and radius of most vertebrates used for meat cuts. It is not intended that the present invention be restricted totally to round bones, though it has been developed with the considerations of these types of bones in mind. The present invention may therefore be adapted for use with other types of bones though typically some consideration will have to be given to the design of the collar and perhaps any means for implementing relative movement between the components and/or holding the bone or bone assemblage in place. It is also noted that in many cases the method may not necessarily be applied to a single bone, but to an assemblage of interconnected bones.

Most embodiments of the method and apparatus of the present invention will rely upon the aforesaid collar to pass along the length or some other axis of the bone (the term bone wherever used herein also including within its scope, where appropriate, an assemblage of individual bones) and scrape or push ahead of it meat. In many embodiments, the collar will exert a pressure on the bone material during a scraping process. However, as previously mentioned, where any meat portion will not readily peel away from the bone material, direct contact or a high pressure exerted by the collar on the bone material, may be required.

To enable the collar to exert a pressure on the bone material and/or accommodate the changing cross-sectional configuration and dimensions of a bone, it is desirable to make the collar deformable at least about its inner aperture. Several methods are available to provide this deformation and these will now be discussed.

The first method is to make the collar, at least about its inner aperture, of a deformable material. Typically this material will also be resilient so that the collar may spring back to its original shape as the configuration of the bone passing through changes. Preferred characteristics of such materials are that not only are they resilient and deformable, but preferably they should also exhibit (for durability) tear resistance, a high stretch point before yield and/or some hardness so as to provide a scraping action. In addition, it is desirable in many cases that the material is also of food grade. Examples of some materials which are suitable, are plastics materials, urethane based materials, some rubbers, and silicone rubbers. However, food grade requirements vary from region to region and all of the aforesaid examples may not always be applicable. Other materials outside of these examples may also be considered.

Another method for providing for deformation of the collar, at least about its inner aperture, is to construct the collar so that this particular portion can bend or physically deform out of the way. While typically these embodiments will also make use of a resilient deformable material, physical characteristics (for instance slots) can assist in deformation so that a much more rigid material may be considered.

Yet a further possible example is to rely on the use of an outside influence to help force or pressure the collar against the bone material. Typically this influence will result in the application, by the collar, of an inwardly directed force or forces onto bone material positioned within the inner aperture. This can result from a force or forces provided by a variety of means, including at least one of: the use of a constricting iris, pneumatic means, hydraulic means, and members acting radially inwardly on the collar. In some of these variations, the collar may be substantially hollow and rely upon one or more of the foregoing means (and particularly pneumatic or hydraulic means) to help expand the collar. Preferably, any expansion is substantially inwardly.

As a further variation, a hollow collar filled with a fluid like substance may be advantageous where there are significant changes in the cross-section of a bone. Substantial deformation of one portion of the collar will tend to increase the fluid pressure acting on other points of the collar which may increase the ability of the collar to conform to more complex cross-sectional configurations.

Yet another variation is to apply a compressive force to the collar (which in this case comprises a deformable resilient material) with the compressive force forcing the collar substantially inwardly.

A collar in most embodiments of the present invention may form part of an assembly which may provide some support to the collar. In many embodiments, the collar will be positioned within an assembly having a peripheral wall about said collar. In many instances this peripheral wall will be substantially cylindrical though the wall, and also the collar, need not be substantially cylindrical or circular in appearance.

In some embodiments, the assembly coming the collar may also provide an additional function. For instance, in at least one embodiment, the peripheral wall interacts with another component of the apparatus to sever any meat and/or tendons connecting meat removed from the bone (after a meat removal operation) to the bone. In these embodiments, typically a portion of the collar assembly, such as the aforesaid peripheral wall, provides a cutting or severing action on the connecting tissue. Typically, this cutting action is only when a portion encounters a firm backing region, such as another component, so that cutting of the meat will not occur part way through a meat removal step.

In some embodiments there is provided a first retaining means, typically positioned to hold the portion of the bone last encountering the collar during meat removal. In these embodiments, the retaining means may provide the firm backing surface that the collar assembly can act against, cutting any connecting tissue as it presses against same. The collar assembly may be modified to provide a sharpened or tapered edge or may otherwise physically interact with the collar assembly. One example would be a narrow peripheral flange on one component accepted by a groove of commensurate dimensions in the other interacting component. The result as the flange enters the groove would be severing of any tissue therebetween. As can be appreciated, there are many ways in which any remaining connecting tissue can be removed after meat removal, and methods may also rely upon manual labour to effect this removal.

Typically, during meat removal, it is desirable to provide some support to the bone. While the collar may provide some support to the bone, at least in the region that it is acting upon, the support it provides is generally against lateral movement of the bone rather than longitudinal movement. Consequently, it is desirable to provide some means to restrict longitudinal movement of the bone, at least in one direction, for a meat removal operation. Consequently, many embodiments will employ a first retaining means which can, in some embodiments, also provide longitudinal relative motion of the bone.

Many configurations for a first retaining means are possible. Typically, they will be positioned, at least initially, at an end of the bone opposite to where the collar is initially present. Consequently it is desirable that the first retaining means should be able to also prevent lateral movement of the bone, at least at or near this end, to prevent this end of the bone from sliding to the side as the collar performs its relative motion along the length of the bone. Consequently, many embodiments of the first retaining means will either provide a clamping action on the end of the bone, or more simply comprise a concave portion, or a portion able to adopt a concave shape. Typically a concave type portion will cup the end of the bone and provide adequate support during most meat removal operations.

The configuration of the concave portion will typically be in accordance with the type of bone material commonly encountered. In some cases, removable inserts or portions may be provided to allow the first retaining means to be adapted for different bones and sizes. In a preferred embodiment, the concave portion comprises an insert of a deformable material. This deformable material has already been formed into the approximate shape of the type of bone typically encountered during an operation. Its deformability helps the cavity to further conform to variations in the size and configuration of different bones of the same type. The use of a deformable and resilient material may also increase the grip on the end of the bone in this region.

In such embodiments, as well as other possible embodiments, the first retaining means may comprise an assembly and this may include a peripheral wall which in some embodiments can interact with the collar assembly. An example has been given previously in the description where the peripheral wall of the collar assembly can interact with the peripheral wall of the first retaining means or other component, to provide severing of any remaining connecting tissue between meat and bone.

While it has been previously mentioned that the collar can provide some support to the bone, in some instances it is desirable to provide some support to a bone until the collar assembly can be put in place (i.e. an end of the bone inserted into the collar's inner aperture). In these cases an initial restraining means may be relied upon, and this may provide support during the entire meat removal operation, or be repositioned or withdrawn after the collar is place.

One possibility is the use of an elongate member which clamps or holds an end of the bone, typically opposite where a first retaining means would be positioned. Typically this is at an end of the bone which the collar will initially begin its travel. Such an elongate member will typically be orientated to be substantially aligned with the direction of travel of the collar relative to the bone, and generally this will be equivalent to the longitudinal axis of the bone. Typically, in such embodiments, the elongate member will be positioned within the inner aperture of the collar so that the collar will begin its relative travel along the elongate member and transfer to the bone material once it reaches the end of the elongate member's body.

The elongate member may clamp the top of the bone or may comprise a cupped portion such as has been described for the first retaining means. In such embodiments, the elongate member will generally rely upon the presence of another component (such as a first retaining means) to provide a co-operative clamping action on the bone.

An alternative method is the use of a clamping assembly which acts directly upon the bone, and wherein the clamping assembly need not be substantially longitudinally orientated. However, if the collar is unable to pass over the clamping assembly, then it may be necessary to reposition or withdraw said assembly during the relative travel between the collar and bone.

One particular type of clamping assembly comprises the use of an assembly with at least one fixed pin and a rotatable arrangement comprising a plurality of extending pins. The rotatable arrangement will typically comprise pins which can pierce the meat either side of said bone or at least be positioned either side of the bone. This rotatable arrangement can then be subsequently rotated so that the pins come into contact with the bone, or act on the bone through the meat. The presence of the fixed pin, where provided, can help prevent the subsequent rotation of the entire bone where this would be a problem and thus a clamping action can be provided between the rotatable and fixed pins. This is but one example and other arrangements are possible.

One embodiment of the method according to the present invention comprises the movement of a flexible (i.e. able to deform to accommodate various contours passing through its inner aperture) collar over bone material, the collar providing a scraping action on the bone material during meat removal. Various other embodiments may include additional steps and/or variations of procedures.

For instance, it may be desirable in some cases to remove at least one end portion, or part thereof, of the bone. In the case of bones such as the humerus and radius, this will serve to remove the portions of the greatest cross-section and requiring the greatest deformation by the collar as well as severing any tendons. It is desirable in most instances that any tendons or connecting tissue to the bone be severed or removed at least the end where the collar begins its travel. This facilitates a peeling action of meat from the bone rather than a straining effect of meat through tendons (resulting in a meat paste). This initial severing may be performed manually or cutting apparatus provided as part of a collar assembly. Other methods are also possible.

Where there is a bone assemblage, it may be necessary to sever tendons at various points therealong. Manual, automated and/or semi-automated methods may be used and there may be some co-operation with other components to perhaps temporarily slow or halt progress of a collar along a bone.

The collar will then travel along the length of the bone, though it is noted that this is a relative movement and the collar and/or bone may be moved according to a particular embodiment. The result is a scraping/peeling action which tends to remove in a substantially whole, undamaged, from the meat. At the end of this peeling type action any remaining connecting tissue can be severed so that the meat can be removed. This may be performed as part of the method, or the bone and connected meat removed and subsequently separated by a manual procedure.

In embodiments where there is a first retaining means, one end of the bone will typically be positioned in same prior to meat removal by the collar. Where an initial restraining means is also provided, then this is also typically positioned to act on the bone prior to action of the collar. In some embodiments it may be necessary to reposition or withdraw the initial restraining means to allow for passage of the collar with respect to the bone. In an itemised form, one possible method for the removal of meat from an elongate bone or a assemblage of bones may comprise the steps:

i) positioning the lower end of said bone or assemblage in first retaining means;

ii) securing the alternate end of said bone or assemblage in initial restraining means positioned near said end;

iii) severing tendons securing meat to bone near said alternate end;

iv) positioning a collar with a deformable inner aperture about said alternate and;

v) performing relative movement of the collar with respect to said bone or vi) assemblage towards said lower end so as to peel meat from bone material; moving and/or withdrawing said initial restraining means to allow for the passage of moving components;

vii) severing any tendons securing meat to the lower end of said bone or assemblage.

Accordingly, apparatus for removal of meat from bones in the aforesaid manner, will typically comprise:

means for restricting movement of a bone or bone assemblage in at least one longitudinal direction;

a collar having an internal aperture and being deformable in this region to accommodate variations in the cross-sectional dimensions and configuration of bone material when positioned therein, and means for effecting relative motion of said collar and bone, or bone assemblage, in a substantially longitudinal direction.

BRIEF DESCRIPTION OF DRAWINGS

Further aspects of the present invention will become apparent from the ensuing description which is given by way of example only and with reference to the accompanying drawings in which:

FIG. 1 a side cross-sectional diagrammatic view of one embodiment of the present invention for use on a single bone, and is the FIG. 1 accompanying the provisional specification FIG. 2 a side cross-sectional diagrammatic view of a similar embodiment to FIG. 1 being used for a bone assemblage, and is the FIG. 2 accompanying the provisional specification FIGS. 3a–3c are a sequence of views showing an alternative embodiment of the present invention being used to remove meat from a bone assemblage.

BEST MODES FOR CARRYING OUT THE INVENTION

Figure 4:
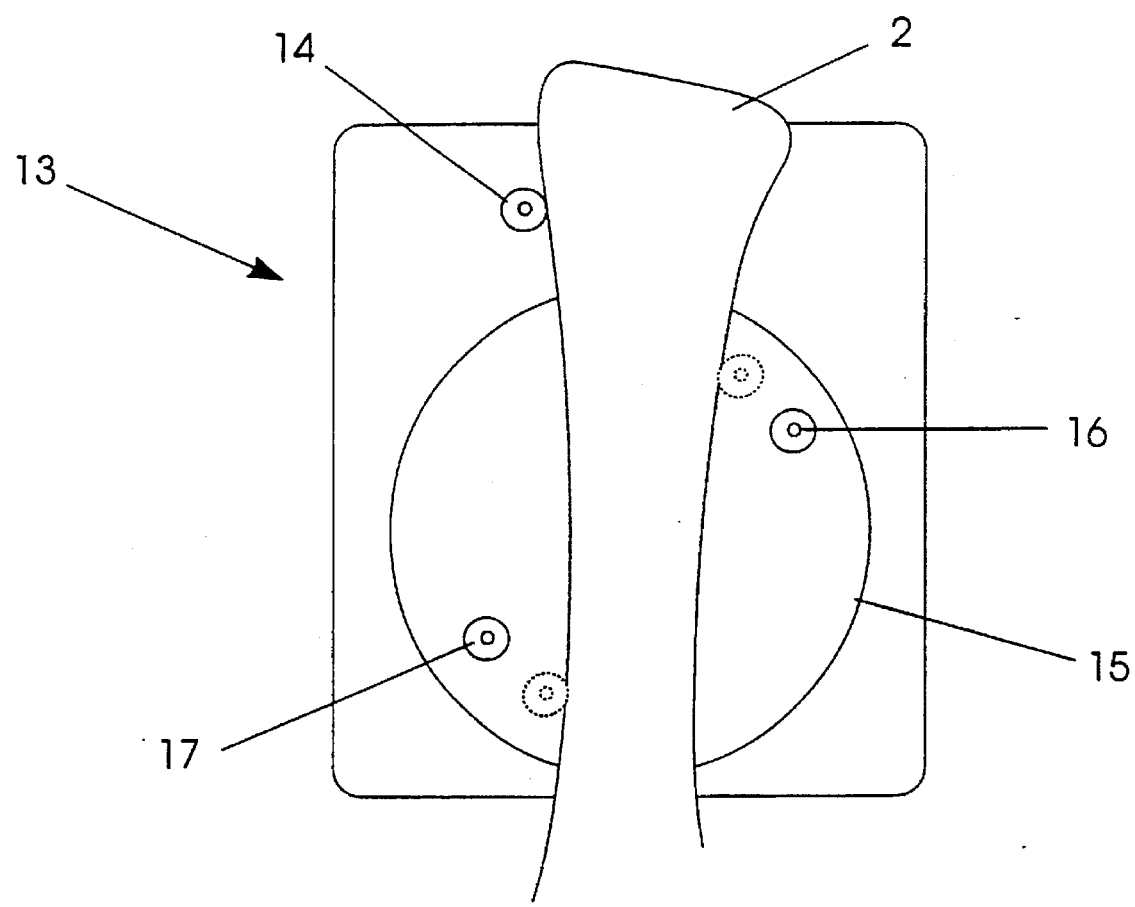
FIG. 4 is a side diagrammatic view of embodiment of first restraining means.

This example describes the embodiment illustrated in FIGS. 3a to 4. In this embodiment there is provided apparatus for the removal of meat 1 from bones 2 comprising:

means 3 for restricting movement of a bone 2 in at least one longitudinal direction 4;

a collar 5 having an internal aperture 6 and being deformable in this region (6) to accommodate variations in the cross-sectional dimensions and configuration of bone material 2 when positioned therein, and means for effecting the relative motion of said collar and bone 2 in a substantially longitudinal direction 4.

In the illustrated embodiment, the collar 5 is part of an assembly comprising a support 7 therefor. This may be connected to means to enable it travel along the length of the bone. Alternatively, relative motion between bone 2 and collar 5 may result from movement of the first retaining means 3, or as a result of the action of both assemblies (3, 8).

The first retaining means comprises a support 9 of a relatively rigid material (e.g. a stainless steel) having an insert of a deformable resilient material (e.g. a food grade plastics material, urethane, rubber and/or silicone material). This insert 10 has been plastics material, urethane, rubber and/or silicone material). This insert 10 has been sculptured to resemble the bone 2 portion that it accommodates and will deform slightly to make up any variations or irregularities between different bones of the same type.

It will also be noted in FIG. 3c that the edges 11, 12 of the collar 8 and first retaining 3 assemblies have been tapered to provide a severing action on any connecting tissue between the meat 1 and bone 2. While this severing may only be partial, it is generally sufficient for the meat 1 to be removed from around the closed assemblies. Some trimming with a knife or other sharp edge may be required to help facilitate removal but at least the clamping action of the members facilitates this process.

In FIG. 4 is visible an initial restraining means 13. This has not been shown on the sequence for FIGS. 3a to 3c for clarity though will typically be positioned, initially, near the top end of the meat and bone cut (refer FIG. 3a) until the collar can attain the position illustrated in FIG. 3a. Generally after that stage, the support provided by the collar 5 and its assembly will be sufficient and the initial restraining means 13 may be shortly thereafter removed.

The initial restraining means generally comprises at least one fixed pin 14 in conjunction with a rotatable arrangement 15 having at least two pins 16, 17 thereon. These pins 16, 17 are initially positioned either side of the bone 2 and the arrangement 15 subsequently rotated so that pressure is applied by these pins 16, 17 on the bone 2. The result is a clamping action between the fixed 14 and rotatable pins which is sufficient to hold the bone until the collar and its related assembly can be positioned. This may be also sufficient to hold the bone during any initial sawing process. It is also noted that such an arrangement may also be provided as a substitute for the first retaining means 3 illustrated in FIGS. 3a to 3c though some modification may be required to be made to help the assembly resist longitudinal movement of the bone in direction 4.

Further detail is given on the use of an initial restraining means 13 of the type previously described, in a method of meat removal, and on the method of meat removal illustrated in at least the embodiment of FIGS. 3a to 3c.

The method of holding the bones: particularly applicable to the humerus, though applicable to any of the 'round bones'.

Generally, the method involves pushing the meat cut (usually either a shoulder or leg) on to a number of pins in a particular way so that the pins pierce the meat adjacent the bones. The first pin is individually mounted and the meat is placed so that this pin pierces the meat adjacent the bone towards one end of the bone to be clamped. A further two pins are spaced apart a distance about 1.25 to 2.5 times the thickness of the bone, and mounted on a common boss which can be rotated about a line parallel to and equidistant between the centre-lines of the pair of pins.

As the meat is pushed on to the pins this pair of pins are orientated such that the line between the pin centres is more or less perpendicular to the line of the axis of the bone, and the meat is so directed that each of the pins of the pair lie on either side of the bone. When the bone is positioned correctly the pair of pins are rotated so that the one on the same side of the bone as the first (independently mounted) pin moves away from that first pin. Sufficient torque applied to the rotation of the pair of pins will force the pins round to contact the bone and force the bone to contact the first pin. The torque then applied to the pair of pins then determines the clamping force. Once clamped a lock mechanism may be employed to lock the rotation of the boss and thus secure the bone. Contours or depressions may be made in the shafts of the pins in suitable positions and of suitable geometry to locate the bones in the plane of the pin centre-lines.

Specifically in the case of the humerus the first, individually mounted, pin is positioned close to the junction of the distal extremity and shaft on the anterior side of the humerus. The shoulder is then pushed over the pair of pins so that one (of the pair) lies to either side of the humerus about two thirds of the length of the bone from the distal end towards the proximal end. The pair of pins is then rotated so that the pin on the anterior side of the bone moves towards the proximal end of the bone. Such a configuration allows for either left or right shoulders to be clamped in the same mechanism by the humerus and in both cases the axis of the humerus will fall on a line substantially coincident with line through the individually mounted pin and the axis of rotation of the pair of pins. The bone is thus secured in both axial directions by, on the one hand, the individual pin restraining the distal extremity and, on the other hand, the three pins preventing motion due to the wedge shape of the bone being larger at the proximal end.

b) The method of cutting around the circumference of a round bone to sever any meat or tendons in the region of the bone.

As a part of the successful operation of a system using the boning method described it may be necessary to cut some tendons, connective tissue or meat in the region of the bone. This can be achieved by the use of a knife which is applied to the bone, such that the plane of the blade is substantially perpendicular to the axis of the bone, said blade the being rotated about the bone with the centre of rotation roughly coincident with the bone axis.

Mechanised cutting equipment may also be employed.

c) The method of sensing the position of the end of any bone in general and in particular the proximal extremity of the humerus.

In order to remove the scapula from the shoulder it is necessary to accurately locate the position of the joint between scapula and humerus; i.e., the proximal extremity of the humerus. This can be achieved by a pin introduced from outside the meat, on a line substantially coincident with the axis of the humerus, towards the proximal end of the humerus. Said pin is mounted on a pivot or slide arrangement and sprung towards the humerus by means of a spring, air cylinder or the like with sufficient force that the pin penetrates the meat but not the bone. As the body on which the pin assembly is mounted is moved towards the humerus (it should be noted that the meat may also, or alternatively, be moved towards the pin) the pin will thus penetrate the meat until the pin point rests against the proximal end of the humerus, at which point a relative motion between pin and the mounting body will be generated due to the spring mounting of the pin. This change in relative position of pin and mounting body may be easily detected by any number of means commonly used such as a proximity sensor, limit switch or the like, and the signal used to stop the motion of the body on which the pin assembly is mounted. Thus, no matter what the length of the humerus, the body will be stopped in the same position relative to the bone end. Provided the mechanisms used to remove the scapula are mounted on this body, then, the mechanisms will be presented to the joint and the scapula in the correct position for their operation regardless of bone length.

This method of location of the bone end is applicable to either end of any bone, however is of particular value in the case of the proximal end of the humerus as in the natural position the scapula lies at an angle to the line of the humerus providing a clear path through the meat for the pin until the bone end is reached. When used clamping edition with the clamping method described above (for clamping either left or right humerus bones) the method is still, typically, of more value since the same mechanisms will locate the joint accurately for either left or right shoulders, without adjustment.

EXAMPLE 2

Figure 2:
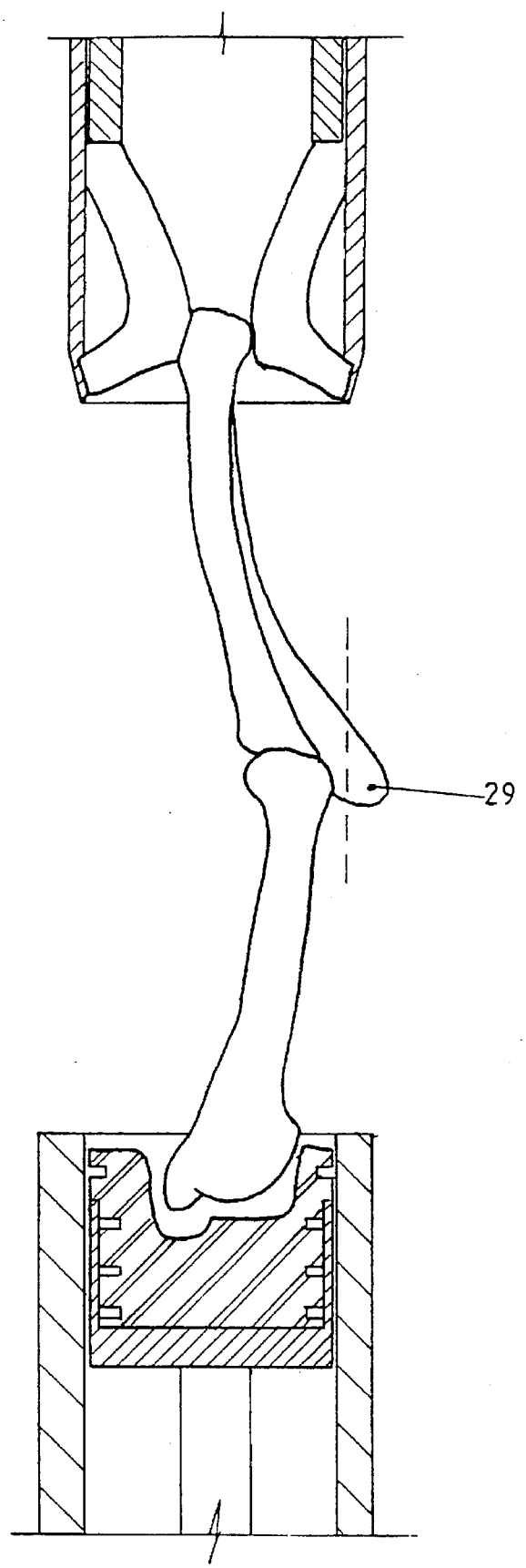

An alternative embodiment is illustrated in FIGS. 1 and 2. In this embodiment, the principal of operation is to separate the meat from the bones by means of forcing the bone(s) through a flexible collar or alternately by forcing a flexible collar over the bone(s). In each case the separation is achieved by forcing a relative motion between the bones and the collar, in a direction substantially coincident with the axis of the bone(s).

The collar (20) is made from a flexible material, such as a urethane or rubber and housed in a body (21) of steel or the like. The shape of the collar will depend on the exact bone which is to be removed. In general the orifice through which the bone passes will be of a size similar to the cross-sectional area of the smallest section of the bone and the leading edge of the orifice will have only a slight radius, if any, and an angle between the face and orifice in the range of about 45 to 135 degrees. The geometry and constraction of the collar is such that the orifice can expand to a size large enough to accommodate the largest cross-section of that part of the bone (23) which is to pass through the orifice. The essence of the invention is the combination of material and geometry which provides a tight fit around the bone at all parts of the length of the bone, (in order to provide a scraping action to separate meat and bone) and the method of restraining and gripping the bone(s) as the collar is forced over the exposed end and subsequently over the length of the bone(s). In some cases, for example the ulna/radius (shank), it may be desirable to cut the bone end (knuckle) off to facilitate starting the collar on the bone. Further, to facilitate starting the collar over the bone end, it may be desirable to guide the bone end into the aperture by means of a steel guide (24) contoured on its end to locate the bone and tapering to a slim shank which is captive in the collar. Thus the aperture in the collar may be opened progressively by the tapered guide so that a bulbous or sharp bone end is introduced into the collar with the minimum of force and minimum tendency to slip away. The guide can also be used to eject the bone(s) from the collar and tube after the completion of the boning cycle by forcing the cleared bone(s) back through the collar as the guide is returned to its start position.

The use of such a guide (24) is not necessary in some cases. In one embodiment of the machine the bone is guide by separate external means to the orifice and forced through the orifice either completely, or up to the ball end of the bone. In the latter case with this configuration the ball end of the bone may be cut off using a saw or the like before the main part of the bone is finally forced right through the orifice.

A further variation is to provide means to compress the collar radially from the outside so that the orifice in the flexible collar material closes around bones of smaller cross-section than the size of the orifice in the collar when relaxed or unstressed. Such a compression may be achieved by any number of means familiar to those skilled in the art such as; an iris action, a tapered chuck action, a separate pneumatic or hydraulic collar, or by axial compression of the collar itself leading to radial compression of the orifice by nature of the particular geometry of the flexible collar.

The collar may take any of a number of forms. One form is shown in the accompanying FIG. 1 and FIG. 2, but other forms such as a plain disc with a central orifice are applicable to some embodiments of the method. A further embodiment of the invention, suited particularly to the removal of the scapula, uses a collar with the orifice resembling the cross-sectional shape of the bone to be remove, said collar being made in two parts which may be moved in a direction substantially perpendicular to the plane of the flat scapula bone, with the line of the joining edge of the two sides coincident with the plane of the bone.

Generally, as the bone(s) is (are) pushed into the collar it (they) must be restrained axially. One effective method of achieving this restraint is to locate the bone end in a concave shaped boss (25). In one embodiment of the device herein described, such a boss is constructed of steel with a depression which contains a contoured pad (26) of a material such as urethane or rubber. The size of the depression and pad are such that when the collar, in its surrounding body, is forced towards the end of the bone the bulbous end of the bone can be accommodated in the space as the flexible collar and pad are deformed around the bone. Thus the meat is squeezed from the bone and also excluded from the region where the collar and boss come together, due to the high pressures required to deform the flexible components, as they come together. If the end of the collar housing is machined to a thin flat annulus (27) and it is forced onto a flat surface on the boss any remaining connections of meat and bone are severed by the crushing action between the two steel surfaces. Alternatively the end of the collar housing may be machined to a conical form and be forced on to a mating surface on the boss to achieve a similar cutting action. In order to ensure that adequate compressive force is applied to exclude the meat from the region of the bone end the flexible pad within the boss may be able to move axially within the boss and be subjected to force from an external actuator (28).

In the case of the scapula, the bone may be grasped by a suitable gripping jaw (at the humerus end) after that end has been pushed through the orifice, and the relative motion of the bone and collar achieved by pulling the bone through the collar.

The method is not only applicable to single bones but may be applied in such a way as the collar being forced over two or more connected bones. For example, in one embodiment of the invention (FIG. 2) the ulna/radius (shank) and humerus of hoofed animal carcasses may be boned with one pass of the collar over the bones starting at the knuckle end of the shank. This may require some minor preliminary work, for example removing the projection of the ulna (29) at its end adjacent to the humerus.

In some cases it may be necessary or desirable that some tendons be cut during the process of forcing the meat from the bone by the collar. In such cases a knife may be driven around the bone in a plane perpendicular to the axis of the bone in such a way that the sharp edge of the knife is forced against the bone, severing any tendons laying on the bone.

The method herein described removes the bones from meat with the minimum disruption to the meat tissue. Many variations to the principle are possible: e.g. the method of mounting the collar and boss, the means of forcing them together, the preparation of the bone(s) or meat, the method of holding the bones before the inherent restraining action of the collar and boss nullifies the need for any external gripping means, the hardness and chemical composition of the components, the shape of the orifice in the collar and the means of ejecting the bones subsequent to removal of the meat. The essential element of the invention is that the separation of meat from bone is accomplished by a collar of flexible material which is forced relative to the bones to effect a scraping action to dislodge meat from bones.

Currently the removal of the bones from meat is generally done manually with the aid of hand held knives. Some mechanical devices are available and in use, but their use is restricted because the meant that results from their use is damaged to a degree that it is usually of commercial use only as a manufacturing meat and a risk of bone chips being included in the meat exists, particularly when cuts of varying size are processed. The method described here is new and has a number of potentially realisable advantages over current practice:

Consistent high yields of meat can be gained

Labour requirement is and the level of skill of machine operators is much lower than the high skill levels required of manual boners Meat quality is improved over current methods with the elimination of knife slashing to the meat (as in common in manual boning) and with the elimination of the damage to the structure of the tissue (as is common to other mechanical devices in use).

The hygiene quality of the meat is improved due to the reduction in handling and cutting Aspects of the present invention have been described by way of example only and it should be appreciated that modifications and additions may be made thereto without departing from the scope thereof as defined in the appended claims.

I claim:

1. A method for removal of meat from an elongate round bone structure, said bone structure surrounded by meat and having first and second ends wherein the first end is larger than the second end, comprising the steps of:

(a) positioning the first end of said bone structure with meat in restraining means;

(b) positioning the second end of said bone structure with meat in a collar having a flexible aperture, said collar being surrounded fixedly by a peripheral wall having an edge near said collar;

(c) performing relative movement of said collar with respect to said bone structure in a first direction towards said restraining means until said collar reaches the vicinity of the first end of said bone structure, wherein said collar scrapes meat from said bone structure as said bone structure passes through said aperture; and (d) after removing meat from said bone structure by the action of the collar or peripheral wall bearing against said restraining means, retracting said collar in a reverse direction so as to remove said bone structure from said collar.

2. A method as claimed in claim 1 wherein, in step (c), said restraining means is not moved with respect to said bone structure.

3. A method as claimed in claim 1 wherein the restraining means has a concave configuration for accommodating the first end of said bone structure, and in step (a), the first end of said bone structure is positioned in said concave configuration.

4. A method as claimed in claim 1 wherein said restraining means comprises a support having an edge engaging with said edge of said peripheral wall when said collar reaches the vicinity of the first end of said bone structure in step (c), and wherein, in step (c), said collar is moved until said edge of said peripheral wall is engaged with said edge of said support.

5. A method as claimed in claim 1 wherein, in step (d), the removal of said bone structure from said collar is conducted by pushing the second end of said bone structure back through the collar after the retraction of said collar.

6. A method as claimed in claim 1 wherein said collar has a doughnut-like structure having an inwardly pointed triangular portion wherein said inwardly pointed portion forms said aperture and has a size similar to the cross-sectional area of the smallest section of said bone structure.

7. A method as claimed in claim 1, further comprising, between steps (a) and (b), the step of securing the vicinity of the first or second end of said bone structure in second refraining means for restricting movement of said bone structure.

8. A method as claimed in claim 7 wherein the second restraining means comprises a rotatable pin arrangement providing a clamping action on said bone structure, and the securing step is conducted by clamping said bone structure in said second restraining means with said pin.

9. A method as claimed in claim 7, further comprising the step of partially or completely severing tendons securing meat to said bone structure at at least the second end of said bone structure.

10. A method as claimed in claim 1, further comprising, prior to step (a), the step of removing projecting portions, if any, between the first and second ends of said bone structure.

11. A method for removal of meat from an elongate round bone structure, said bone structure surrounded by meat and having first and second ends wherein the first end is larger than the second end, comprising the steps of:

i) positioning the first end of the bone structure with meat in restraining means;

ii) directing a longitudinally oriented guide against the second end of the bone structure, and clamping the bone structure against the restraining means;

iii) causing a flexible collar having an aperture through which said oriented guide passes, said collar surrounded fixedly by a peripheral wall having an edge near said collar, to travel longitudinally along said bone structure to scrape, ahead of said collar, meat from the bone structure;

iv) subsequently reversing the direction of collar travel with respect to the bone structure; and v) ejecting the bone structure from the collar as the guide pushes the second end of the bone structure.

12. A method as claimed in claim 11, further comprising, between steps (i) and (ii), the step of securing said bone structure in second restraining means to position the bone structure until clamped between said guide and the first-named restraining means.

13. A method as claimed in claim 12 in which the second restraining means comprises a rotating pin arrangement providing a clamping action on the bone structure, and the securing step is conducted by clamping said bone structure in said second restraining means with said pin.

14. A method as claimed in either claim 12 or claim 13 in which the initial restraining means is removed after the bone is clamped between the guide and first restraining means.

15. A method as claimed in claim 11 wherein, in step (iii), the collar travels to the vicinity of the first end of said bone structure, and the edge of said peripheral wall is engaged with the first-named restraining means.

16. Apparatus for removal of meat from a bone structure having first and second ends, said apparatus comprising:

restraining means for restraining movement of the first end of the bone structure with meat in at least one longitudinal direction when said bone structure is positioned;

a collar having an internal aperture and being resiliently deformable in this region to accommodate variations in the cross-sectional dimensions and configuration of said bone structure when positioned therein;

a peripheral wall fixedly surrounding said collar and having an edge near said collar;

means for effecting travel of the collar with respect to said bone structure in a first scraping direction from the second end of said bone structure towards said restraining means; and means for effecting travel of said collar with respect to said bone structure in a direction the reverse of said first scraping direction.

17. Apparatus as claimed in claim 16, further comprising withdrawable second restraining means for securing said bone structure at the vicinity of the first or second end and positioning said bone structure.

18. Apparatus as claimed in claim 17 in which the second restraining means comprises a rotatable pin arrangement providing a bone-clamping action.

19. Apparatus as claimed in claim 18 which the second restraining means comprises an assembly with at least one fixed pin and a rotatable arrangement comprising a plurality of pins, wherein the pins of the rotatable arrangement can be positioned about the meat on either side of said bone structure, and the rotatable arrangement can be subsequently rotated so that a clamping action of the bone structure results from said at least one fixed pin and said pins of the rotatable arrangement bearing substantially against said bone structure.

20. Apparatus as claimed in claim 19 which includes sensor means controlling the clamping pressure applied to said bone.

21. Apparatus as claimed in claim 16, further comprising a guide member providing a clamping action on said bone structure against the restraining means by pushing the second end of said bone structure, said guide member passing through said aperture of said collar.

22. Apparatus as claimed in claim 21 in which the guide member is movable in reciprocating directions with respect to said collar.

23. Apparatus as claimed in claim 16 in which said restraining means comprises a concave portion for accommodating the first end of said bone structure.

24. Apparatus as claimed in claim 16, wherein said collar has a doughnut-like structure having an inwardly pointed triangular cross-section wherein the inwardly pointed portion forms said aperture and has a size similar to the cross-sectional area of the smallest section of said bone structure.

25. Apparatus as claimed in claim 16 wherein said peripheral wall has a structure in which said edge of said peripheral wall is engaged with said restraining means when said collar reaches the vicinity of the first end of said bone structure.

* * * * *